United States Patent
Belot et al.

(10) Patent No.: US 10,044,102 B2
(45) Date of Patent: Aug. 7, 2018

(54) MILIMETER-WAVE TRANSMISSION DEVICE

(71) Applicant: Commissariat à l'Énergie Atomique et aux Énergies Alternatives, Paris (FR)

(72) Inventors: Didier Belot, Rives (FR); Baudouin Martineau, Grenoble (FR); Olivier Richard, Bilieu (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 15/593,508

(22) Filed: May 12, 2017

(65) Prior Publication Data

US 2017/0331181 A1    Nov. 16, 2017

(30) Foreign Application Priority Data

May 13, 2016    (FR) ...................... 16 54300

(51) Int. Cl.
    *H01P 3/00*     (2006.01)
    *H01Q 1/38*     (2006.01)
    *H04B 1/04*     (2006.01)

(52) U.S. Cl.
    CPC ............ *H01Q 1/38* (2013.01); *H04B 1/04* (2013.01)

(58) Field of Classification Search
    CPC ........ H01P 1/172; H01P 1/20318; H01P 3/16; H01P 5/188
    USPC .......................... 333/239, 248, 247
    See application file for complete search history.

(56) References Cited

U.S. PATENT DOCUMENTS

| | | | |
|---|---|---|---|
| 8,674,888 B2 * | 3/2014 | Rofougaran | G06K 7/10237 343/722 |
| 9,123,737 B2 * | 9/2015 | Haroun | H01L 23/66 |
| 9,405,064 B2 * | 8/2016 | Herbsommer | H05K 1/0243 |
| 9,696,490 B2 * | 7/2017 | Herbsommer | G02B 6/1221 |
| 9,761,950 B2 * | 9/2017 | Cook | H01Q 9/16 |
| 2008/0238796 A1 | 10/2008 | Rofougaran | |
| 2015/0263403 A1 | 9/2015 | Spella et al. | |
| 2015/0295305 A1 | 10/2015 | Herbsommer et al. | |

OTHER PUBLICATIONS

Fukuda et al., A 12.5+12.5 GB/s full-duplex plastic waveguide interconnect. IEEE Journal of Solid-State Circuits. 2011;46(12):3113-25.

Tanaka et al., A versatile multi-modality serial link. IEEE International Solid-State Circuits Conference. Digest of Technical Papers (ISSCC). 2012;19(5):3pgs.

Volkaerts et al., An FSK plastic waveguide communication link in 40nm CMOS. IEEE International Solid-State Circuits Conference. 2015;10(2): 2pgs.

* cited by examiner

*Primary Examiner* — Sonny Trinh
(74) *Attorney, Agent, or Firm* — Wolf, Greenfield & Sacks, P.C.

(57) ABSTRACT

A millimeter-wave transmission device including a waveguide made of a material having a dielectric constant in the range from 1 to 4, the waveguide being solid at each of its ends with an electronic unit embedded in the material of the waveguide, the electronic unit including a millimeter wave transceiver circuit, an antenna capable of transmitting and receiving the millimeter waves, a modulation-demodulation circuit, and input-output conductors.

12 Claims, 3 Drawing Sheets

MILIMETER-WAVE TRANSMISSION DEVICE

This application claims priority to French Application No. 16/54300, filed on May 13, 2016, which is incorporated herein by reference to the maximum extent allowable by law

BACKGROUND

The present disclosure relates to a millimeter-wave transmission device and more particularly to a millimeter-wave transmission device made of a dielectric material.

DISCUSSION OF THE RELATED ART

It is known that millimeter waves can be transmitted in a waveguide made of a dielectric plastic material. An advantage of a waveguide made of a dielectric material is that it has a lower manufacturing cost than a waveguide comprising conductive elements.

FIG. 1 is a diagram showing a millimeter-wave transmission system 1 of the type described in the publication entitled "A 12.5+12.5 Gb/s Full-Duplex Plastic Waveguide Interconnect" of Satoshi Fukuda et al. (IEEE Journal of Solid-State Circuits, vol. 46, No. 12, December 2011). Millimeter-wave transmission system 1 comprises a waveguide of rectangular cross-section 3 made of a dielectric plastic material, two antennas 5 and 5', two millimeter-wave transceiver circuits (TX/RX) 7 and 7', and two modulation-demodulation circuits (MOD/DEMOD) 9 and 9'.

Antennas 5 and 5' are formed in respective blocks 11 and 11', each of which is adjacent to one of the ends of waveguide 3. Antennas 5 and 5' are for example capable of transmitting and of receiving millimeter waves which propagate in waveguide 3. Antenna 5 is connected to millimeter-wave transceiver circuit 7. Similarly, antenna 5' is connected to millimeter-wave transceiver circuit 7'. Transceiver circuit 7 is connected to modulation-demodulation circuit 9 and, similarly, transceiver circuit 7' is connected to modulation-demodulation circuit 9'. Modulation-demodulation circuits 9 and 9' are respectively connected to input-output terminals 13 and 13'.

The millimeter waves transmitted by waveguide 3 may be modulated by a binary signal applied to terminal 13 or 13' and demodulated into a binary signal received on terminal 13' or 13.

Antennas 5 and 5' and blocks 11 and 11' being arranged against waveguide 3, the millimeter waves come against a change of medium, possibly with an air interface, which introduces reflection and refraction phenomena which result in signal power losses and in a standing wave return onto the transmitter, which may be harmful.

Further, millimeter-wave transmission system 1 comprises many different elements and thus raises assembly issues.

SUMMARY

An object of an embodiment is to overcome all or part of the disadvantages of existing millimeter-range transmission systems.

An embodiment provides a millimeter-wave transmission device where the millimeter waves do not come against a change of medium.

An embodiment provides a compact millimeter-wave transmission device.

An embodiment provides a millimeter-wave transmission device adapting to standard connectors of USB or HDMI type.

An embodiment provides a millimeter-wave transmission device comprising a waveguide made of a material having a dielectric constant in the range from 1 to 4, the waveguide being solid, at each of its ends, with an electronic unit embedded in the material of the waveguide, the electronic unit comprising a millimeter-wave transceiver circuit, an antenna capable of transmitting and receiving the millimeter waves, a modulation-demodulation circuit, and input-output conductors.

According to an embodiment, the waveguide is made of a material having a dielectric constant in the range from 2 to 4.

According to an embodiment, the waveguide is made of a plastic material, particularly polytetrafluoroethylene, polypropylene, or polystyrene.

According to an embodiment, the electronic unit comprises a printed circuit board, having the millimeter-range transceiver circuit and the modulation-demodulation circuit resting on a first surface thereof, and having the antenna resting on a second surface thereof.

According to an embodiment, the printed circuit board comprises a metal mirror between the first surface and the second surface.

According to an embodiment, the metal mirror is spaced apart from the antenna by a length equal to a half transmission wavelength of the antenna.

According to an embodiment, the antenna has a wavelength in the order of the half wavelength of the millimeter waves.

According to an embodiment, the millimeter waves have a frequency in the range from 30 GHz to 300 GHz.

According to an embodiment, the waveguide is solid, at each of its ends, with an additional electronic unit, the additional electronic unit having an antenna capable of transmitting and receiving millimeter waves having a frequency different from the wavelength of the millimeter waves transmitted and received by the antenna of the electronic unit.

Another embodiment provides a data transmission system comprising a digital data transmitter and receiver, a millimeter-wave transmission device, and two connectors, each connector being connected to one end of the device.

Another embodiment provides a method of manufacturing a millimeter-wave transmission device comprising the steps of: injecting in the liquid state the material having a dielectric constant in the range from 1 to 4 into a mold containing the electronic unit thus forming a molded block; and fusing a surface of the molded block with an end of the waveguide.

BRIEF DESCRIPTION OF THE DRAWINGS

The foregoing and other features and advantages will be discussed in detail in the following non-limiting description of dedicated embodiments in connection with the accompanying drawings, among which.

DETAILED DESCRIPTION

Figure 1:
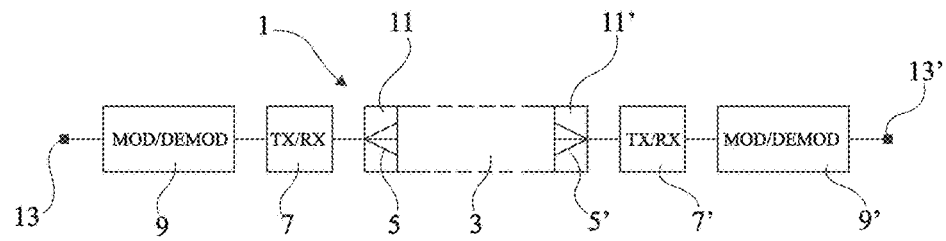
FIG. 1, previously described, is a diagram showing a millimeter-wave transmission system.

The same elements have been designated with the same reference numerals in the various drawings and, further, the various drawings are not to scale. For clarity, only those steps and elements which are useful to the understanding of the described embodiments have been shown and are detailed.

Unless otherwise specified, expression "in the order of" means to within 10%, preferably to within 5%.

Figure 2:
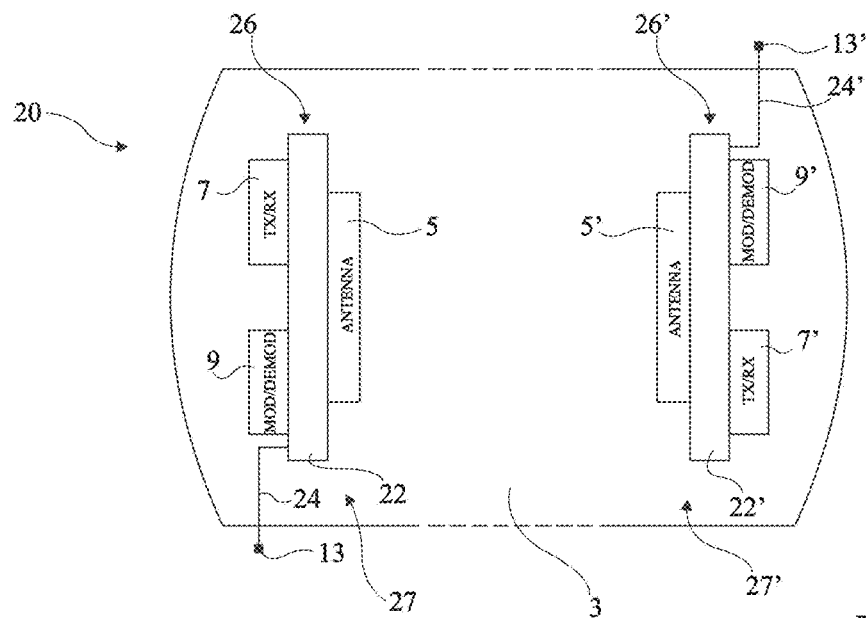
FIG. 2 is a diagram of an embodiment of a millimeter-wave transmission device.

FIG. 2 is a diagram illustrating an embodiment of a millimeter-wave transmission device 20. Device 20 comprises the same elements as the millimeter-wave transmission system described in FIG. 1, that is, a waveguide 3 made of a dielectric plastic material, antennas 5 and 5', transceiver circuits (TX/RX) 7 and 7', modulation-demodulation circuits (MOD/DEMOD) 9 and 9', and input-output terminals 13 and 13'.

The dielectric constant of the material of waveguide 3 is for example in the range from 1 to 4, preferably in the range from 2 to 4. The loss angle or delta tangent of the material of waveguide 3 is for example smaller than $10^{-3}$ to guarantee minimum losses of the signal in waveguide 3. The material may be a dielectric plastic material such as for example polytetrafluoroethylene, polypropylene, or polystyrene. As an example, for a material having a dielectric constant equal to 2 and for a frequency in the range from 30 GHz and 300 GHz, the wavelength of the electromagnetic wave propagating in waveguide 3 is in the range from 7 mm to 0.7 mm. A wave at a frequency in the order of 60 GHz may for example be used, for which, for a material having a dielectric constant equal to 2, the wavelength is equal to 3.5 mm. The length of antenna 5, 5' then is in the order of the wavelength, that is, 3.5 mm. As an example, antennas 5, 5' are narrow-band antennas or wide-band antennas.

Waveguide 3 has a lateral dimension equal to or greater than the maximum wavelength of the wave that can be transmitted. According to an embodiment, in a plane perpendicular to the longitudinal direction of waveguide 3, the cross-section of the waveguide is inscribed within a circle having a diameter greater than or equal to the maximum wavelength of the wave that can be transmitted and smaller than twice the maximum wavelength of the wave that can be transmitted. Waveguide 3 is for example cylindrical with a circular cross-section and for example has a diameter in the range from 4 mm to 6 mm. According to an embodiment, the shape of waveguide 3 is capable of confining the wave at the center of the waveguide to avoid strong signals at the surface of the waveguide, the surface of waveguide 3 being likely to be manipulated by a user. Advantageously, waveguide 3 comprises no elements made of an electrically-conductive material. In particular, the outer surface of waveguide 3 is not in contact with a coating made of an electrically conductive material. For a same application, waveguide 3 made of dielectric material has a lower manufacturing cost than a waveguide comprising electrically-conductive elements. Further, for a same application, waveguide 3 made of dielectric material has a lighter weight than a waveguide comprising electrically-conductive elements.

Waveguide 3 is made of a first dielectric material, corresponding to a first dielectric plastic material, and is surrounded with a second dielectric material. According to an embodiment, the second dielectric material is air. According to an embodiment, the second dielectric material is a second dielectric plastic material, different from the first dielectric plastic material, and waveguide 3 may be surrounded with a sheath made of the second dielectric plastic material surrounding the first dielectric plastic material.

Each of antennas 5 and 5' is positioned on a first surface of a printed circuit board 22 and 22'. The printed circuit boards are for example formed from an organic substrate, for example, of epoxy type. Transceiver circuit (TX/RX) 7 and modulation-demodulation circuit (MOD/DEMOD) 9 are positioned on a second surface, opposite to the first surface, of printed circuit board 22 and, similarly, transceiver circuit 7' and modulation-demodulation circuit 9' are positioned on a second surface of printed circuit board 22'. The different circuits are interconnected by vias and tracks (not shown in FIG. 2) formed in printed circuit boards 22 and 22'. Input-output terminals 13 and 13' are respectively connected to the tracks of printed circuit boards 22 and 22' by conductors 24 and 24'. The assembly formed by printed circuit board 22, antenna 5, transceiver circuit 7, modulation-demodulation circuit 9, conductors 24, and input-output terminal 13 is called electronic unit 26 hereafter. Similarly, the assembly formed by printed circuit board 22', antenna 5', transceiver circuit 7', modulation-demodulation circuit 9', conductors 24', and input-output terminal 13' is called electronic unit 26' hereafter. The fact for circuits 7, 9 and for antenna 5 to be placed on opposite surfaces of the printed circuit advantageously enables the operation of antenna 5 not to be disturbed by the presence of circuits 7, 9. As a variation, circuits 7 and 9 and antenna 5 may be placed on a same side of printed circuit board 22. This enables to decrease signal transmission losses between transceiver circuit 7 and antenna 5. Each unit 26 and 26' is embedded in a block 27, 27' made of the same material as that of waveguide 3, only leaving a portion of conductors 24 and 24' and input-output terminals 13, 13' exposed. Each block 27, 27' is solid with one of the ends of waveguide 3, which makes device 20 a compact device. Thus, antennas 5 and 5' transmit and receive millimeter waves in waveguide 3 with no disturbances due to the crossing of interfaces. Further, according to an embodiment, input-output terminals 13 and 13' only transmit and receive binary signals and form interfaces of connection with the user, which does not have to directly process the millimeter waves.

Figure 3:
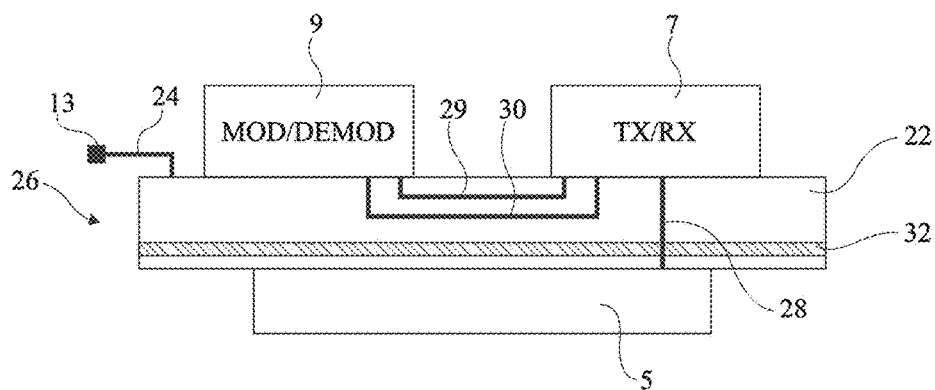
FIG. 3 is a diagram of an example of an electronic unit adapted to the device of FIG. 2.

FIG. 3 is a diagram showing an embodiment of electronic unit 26. In this drawing, the same elements as in FIG. 2 are designated with the same reference numerals. Transceiver circuits 7 and modulation-demodulation circuit 9 are for example "flip-chip" assembled on printed circuit board 22. Printed circuit board 22 further comprises vias and tracks enabling to connect the different circuits 7, 9 and antenna 5. In particular, a through via 28 connects antenna 5 to transceiver circuit 7. Since through via 28 only carries millimeter waves, it might behave as an antenna and direct the millimeter waves in a direction normal to the waveguide propagation direction, which would result in signal losses. Thus, the length of via 28 is minimized by minimizing the thickness of printed circuit board 22. A printed circuit board 22 having a thickness in the range from a few hundreds of µm to a few mm, for example, in the range from 500 µm to 4 mm. The smaller the thickness of the printed circuit board, the less signal losses there are. Tracks 29, 30 connect transceiver circuit 7 to modulation-demodulation circuit 9.

Conductors 24 enable to externally connect electronic unit 26 but also to power circuits 7, 9 of electronic unit 26. Further, to improve the efficiency of antenna 5, printed circuit board 22 may comprise a metal mirror 32, for example, a metal layer, typically copper, positioned at a distance from antenna 5 equal to the half wavelength of the wave transmitted or received by antenna 5. In this case, the printed circuit board has a thickness greater than the half wavelength of the wave transmitted or received by antenna 5, for example, the value of the half wavelength increased by 500 μm. In the previously-mentioned example, for a transmission frequency of 60 GHz and a material forming the waveguide having a dielectric constant of 2, the printed circuit board has a 2.25-mm thickness and metal mirror 32 may be placed at a 1.75-mm distance from antenna 5. Metal mirror 32 improves the link budget of device 20.

Electronic unit 26' has the same configuration as unit 26.

Other circuits may be assembled on printed circuit board 22, 22', for example, signal processing circuits.

Figure 4:
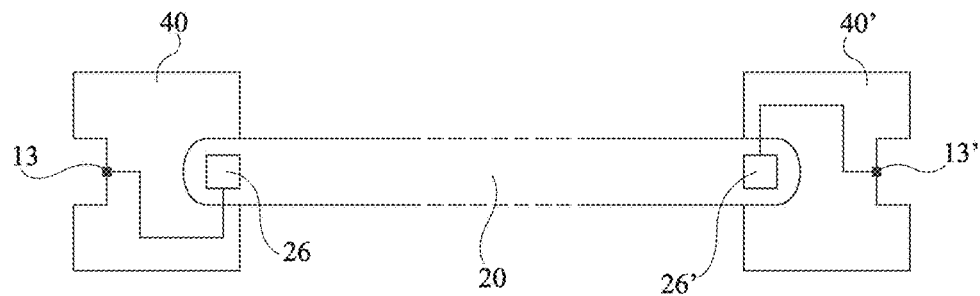
FIG. 4 illustrates the use of the device of FIG. 2.

FIG. 4 is a diagram illustrating an example of use of device 20 of FIG. 2. According to an embodiment, input-output terminals 13 and 13' only transmit and receive binary signals. It is thus possible to directly connect them to standard male or female connectors 40 and 40' such as for example USB or HDMI connectors. Connectors 40 and 40' may also be non-standard SPI-type connectors. Thus, an alternative to a conventional copped-based cable is obtained. Dielectric plastic materials are further less expensive than copper and do not transmit electromagnetic emissions. Device 20 is thus adapted to land, sea, or air vehicles. Further, the waveguide 3 used in device 20 may be used in a dwelling in different ways, such as for example in wall skirtings made of plastic material or in sheaths made of plastic material integrated in furniture.

Figure 5:
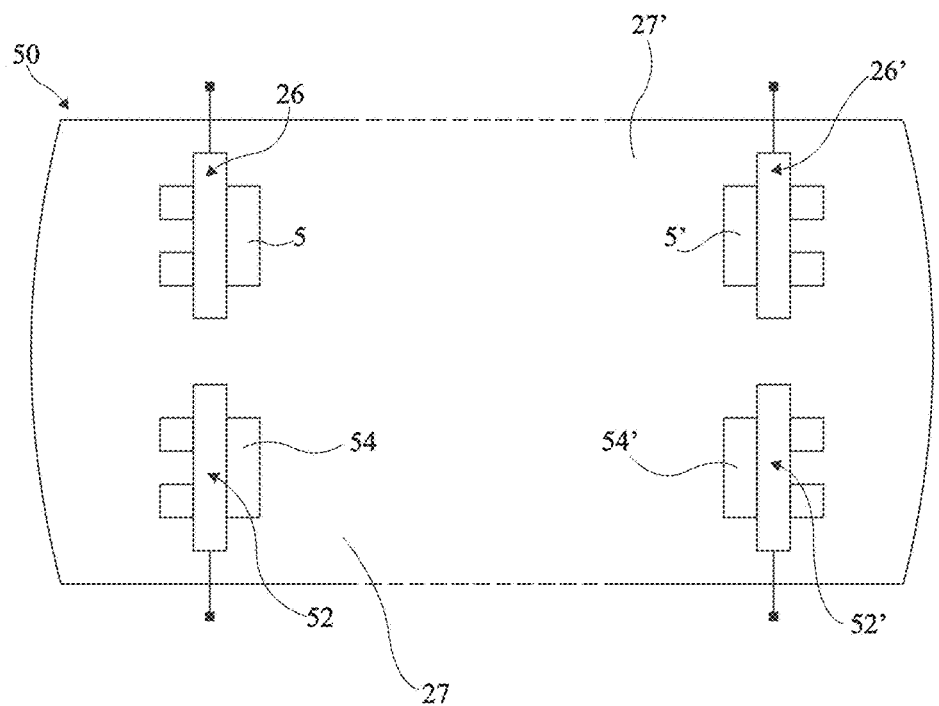
FIG. 5 is a diagram of another embodiment of a millimeter-wave transmission device.

FIG. 5 illustrates another embodiment of a millimeter-wave transmission device 50. Device 50 comprises all the elements of device 20 described in FIG. 2 and further comprises a second pair of electronic units 52 and 52'. Unit 52 is embedded in the same block 27 as unit 26 and unit 52' is embedded in the same block 27' as unit 26'. Units 52 and 52' have substantially the same structure as units 26 and 26' and particularly comprise antennas 54 and 54', with the difference that antennas 54 and 54' transmit and receive millimeter waves having a frequency different from that of millimeter waves transmitted and received by antennas 5 and 5' of units 26 and 26'. Thereby, device 50 may simultaneously transmit two different signals. As a variation, antennas 54 and 54' may also transmit and receive waves phase-shifted by $\pi/2$ and of same frequency as the millimeter waves transmitted by antennas 5 and 5'.

Figure 6:
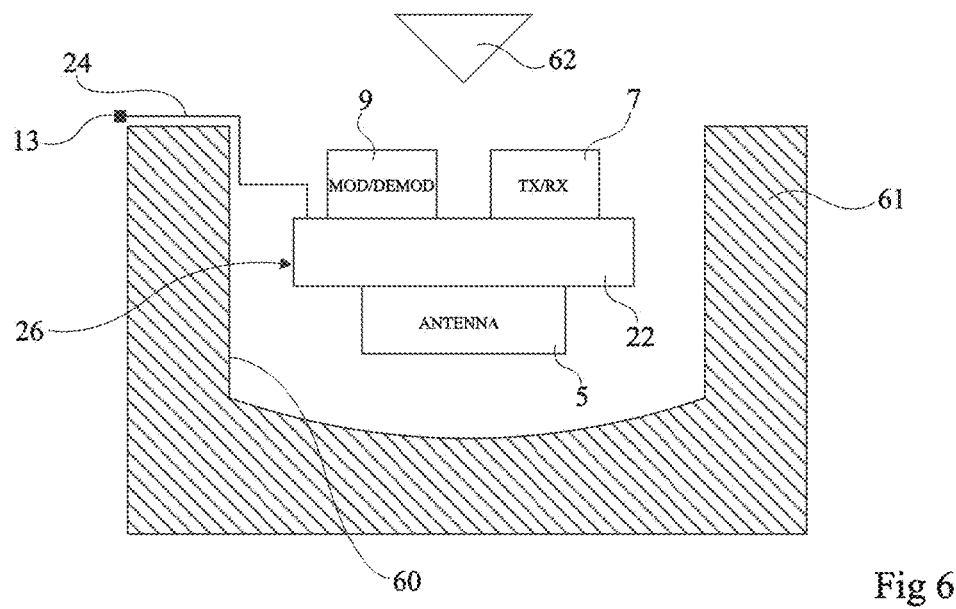
FIG. 6 illustrates a step of an embodiment of a method of manufacturing a millimeter-wave transmission device.

FIG. 6 is a diagram showing a first step of an embodiment of a method of manufacturing millimeter-wave transmission device 20. Transceiver circuit (TX/RX) 7 and modulation-demodulation circuit (MOD/DEMOD) 9 and antenna 5 are assembled on printed circuit board 22 to form electronic unit 26. Electronic unit 26 is positioned in inner cavity 60 of a mold 61. Cavity 60 is capable of entirely containing unit 26 and for example generating a molded block 27 of same cross dimensions as waveguide 3. The assembly of conductors 24 is arranged to protrude from cavity 60 of mold 61. An injector 62 injects a dielectric plastic material in the liquid state into cavity 60 of mold 61. Once the dielectric plastic material has been solidified, electronic unit 26 is totally embedded in the plastic material, except for conductors 24, a portion of which has remained apparent. Molded block 27 is thus obtained.

Figure 7:
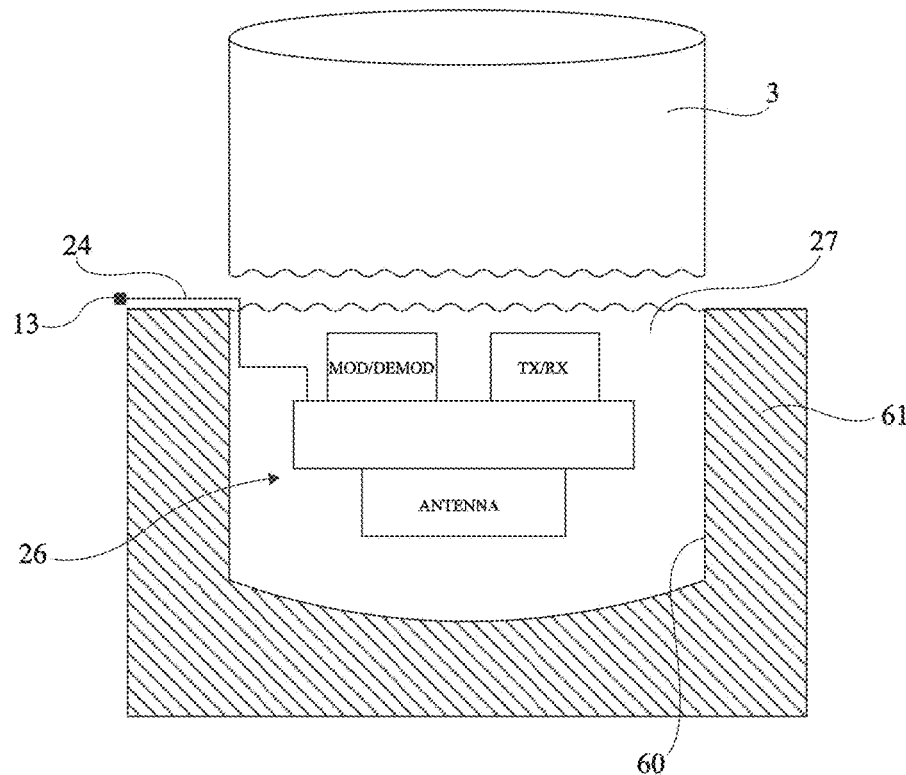
FIG. 7 illustrates another step of the method of manufacturing a millimeter-wave transmission device.

FIG. 7 is a diagram showing a second step of the embodiment of the method of manufacturing millimeter-wave transmission device 20 after the obtaining of molded block 27 containing electronic unit 26. Molded block 27 may be left in mold 61. A surface of molded block 27 and an end of waveguide 3 are heated and then fused together to obtain a single part made of dielectric plastic material. Only a portion of conductors 24 is apparent. Antenna 5 is totally immersed in the dielectric plastic material and the waves that it transmits or receives hit no interface. The steps described in FIGS. 6 and 7 are repeated a second time with second electronic unit 26' at the second end of waveguide 3. The device is then ready to be used. In order to use it, connectors, standard or not, may be adapted on terminals 13 and 13'.

The invention claimed is:

1. A millimeter-wave transmission device comprising a waveguide made of a material having a dielectric constant in the range from 1 to 4, the waveguide being solid at each of its ends with an electronic unit, the electronic unit comprising a millimeter wave transceiver circuit, an antenna capable of transmitting and receiving the millimeter waves, a modulation-demodulation circuit, input-output conductors and input-output terminals, the waveguide comprising no element made of an electrically-conductive material the electronic unit being completely embedded in the material of the waveguide except for the input-output terminal and part of the input-output conductors.

2. The device of claim 1, wherein the waveguide is made of a material having a dielectric constant in the range from 2 to 4.

3. The device of claim 1, wherein the waveguide is made of a plastic material, particularly polytetrafluoroethylene, polypropylene, or polystyrene.

4. The device of claim 1, wherein the electronic unit comprises a printed circuit board, having the millimeter-range transceiver circuit and the modulation-demodulation circuit resting on a first surface thereof, and having the antenna resting on a second surface thereof.

5. The device of claim 4, wherein the printed circuit board comprises a metal mirror between the first surface and the second surface.

6. The device of claim 5, wherein the metal mirror is spaced apart from the antenna by a length equal to a half transmission wavelength of the antenna.

7. The device of claim 1, wherein the antenna has a length in the order of the half wavelength of the millimeter waves.

8. The device of claim 1, wherein the millimeter waves have a frequency in the range from 30 GHz to 300 GHz.

9. The device of claim 1, wherein the waveguide is solid at each of its ends with an additional electronic unit, the additional electronic unit having an antenna capable of transmitting and receiving millimeter waves having a frequency different from the wavelength of the millimeter waves transmitted and received by the antenna of the electronic unit.

10. A data transmission system comprising a digital data transmitter and a receiver, the millimeter-wave transmission device of claim 1 and two connectors, each connector being connected to one end of the device.

11. A method of manufacturing the millimeter wave transmission device of claim 1, comprising the steps of:
injecting in the liquid state the material having a dielectric constant in the range from 1 to 4 into a mold containing the electronic unit thus forming a molded block; and
fusing a surface of the molded block with an end of the waveguide.

12. The device of claim 1, wherein the waveguide is made of only a dielectric material or dielectric materials.

\* \* \* \* \*

UNITED STATES PATENT AND TRADEMARK OFFICE
CERTIFICATE OF CORRECTION

PATENT NO. : 10,044,102 B2
APPLICATION NO. : 15/593508
DATED : August 7, 2018
INVENTOR(S) : Didier Belot et al.

Page 1 of 1

It is certified that error appears in the above-identified patent and that said Letters Patent is hereby corrected as shown below:

On the Title Page

The title reads:
(54) MILIMETER-WAVE TRANSMISSION DEVICE

It should read:
"(54) MILLIMETER-WAVE TRANSMISSION DEVICE"

In the Specification

At Column 1, the title should read "MILLIMETER-WAVE TRANSMISSION DEVICE"

Signed and Sealed this
Second Day of October, 2018

Andrei Iancu
*Director of the United States Patent and Trademark Office*